United States Patent [19]
Bonomo

[11] 3,836,202
[45] Sept. 17, 1974

[54] WHEEL CONSTRUCTION
[75] Inventor: Richard S. Bonomo, Delavan, Ill.
[73] Assignee: Univerferth Manufacturing Company, Inc., Kalida, Ohio
[22] Filed: Feb. 16, 1972
[21] Appl. No.: 226,781

Related U.S. Application Data
[62] Division of Ser. No. 855,494, Sept. 5, 1969, abandoned.

[52] U.S. Cl. ............................................. 301/39 R
[51] Int. Cl. ........................................... B60b 11/06
[58] Field of Search .......... 301/39 R, 39 ST, 39 RC, 301/9 TV, 36

[56] References Cited
UNITED STATES PATENTS

| | | | |
|---|---|---|---|
| 3,237,992 | 3/1966 | Kiesau | 301/39 R |
| 3,337,270 | 8/1967 | Peterson | 301/39 R |
| 3,464,739 | 9/1969 | Johnson | 301/39 R |
| 3,583,767 | 6/1971 | Unverferth | 301/39 R |

Primary Examiner—Richard J. Johnson
Attorney, Agent, or Firm—Molinare, Allegretti, Newitt & Witcoff

[57] ABSTRACT

An auxiliary wheel structure for attachment to a regular vehicle wheel which has angularly spaced apart wheel lugs, including an auxiliary wheel rim, an arcuate track fixedly attached to the auxiliary wheel rim, attaching brackets slidably mounted on the arcuate track for adjustment therealong to positions in alignment with the lugs on the regular wheel, and connecting rods between the brackets and the wheel lugs to mount the auxiliary wheel structure to the regular wheel in side-by-side relationship. The attaching brackets embrace the track on the auxiliary wheel rim to permit sliding adjustment therealong but retaining means are provided to prevent removal of the brackets from the track. Lock members are provided to maintain the attaching brackets on the track in any of the positions of adjustment.

16 Claims, 5 Drawing Figures

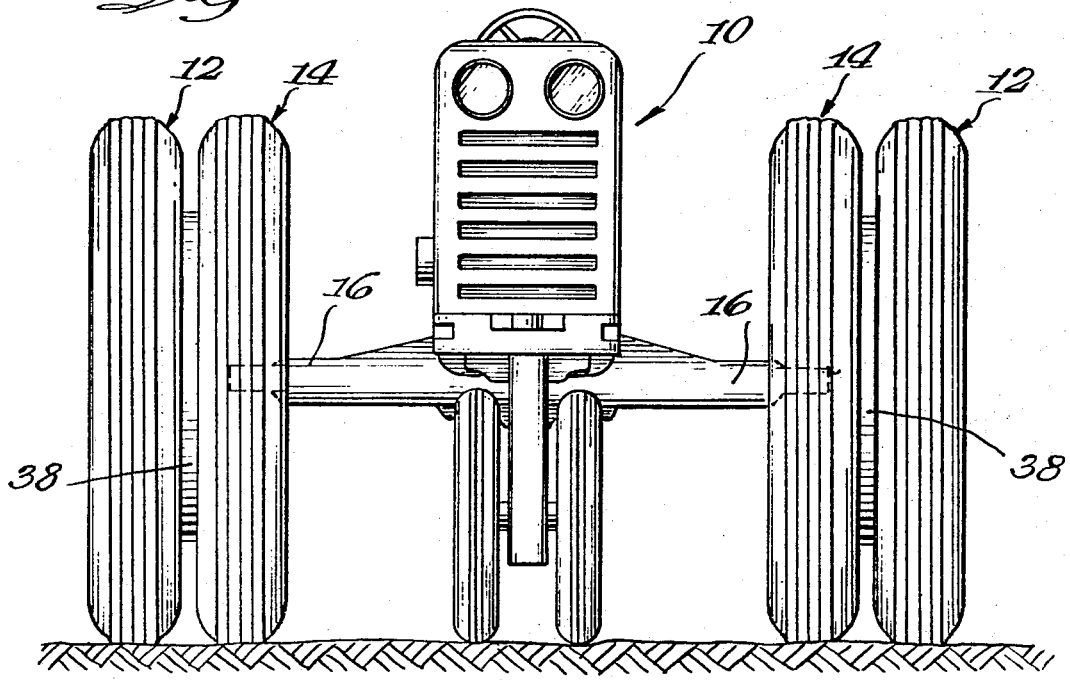
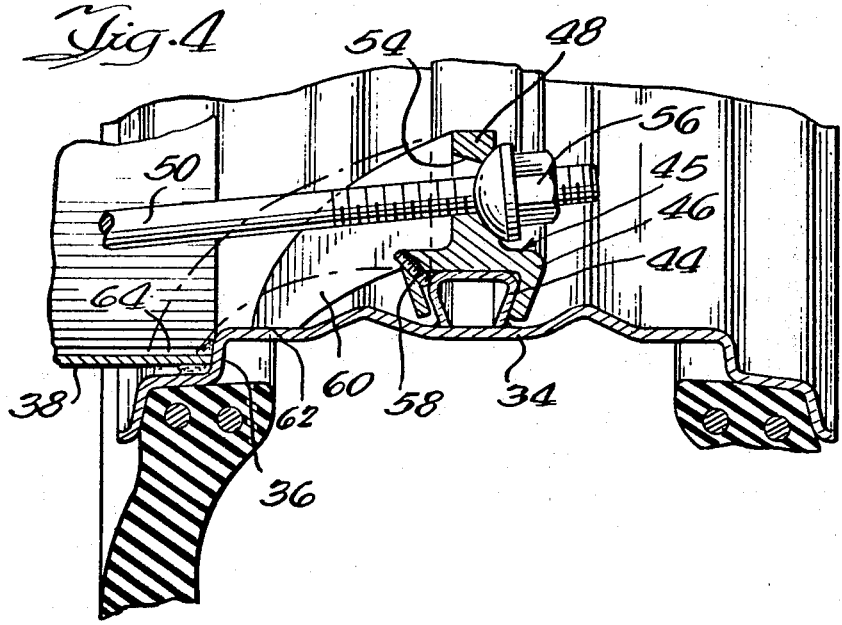

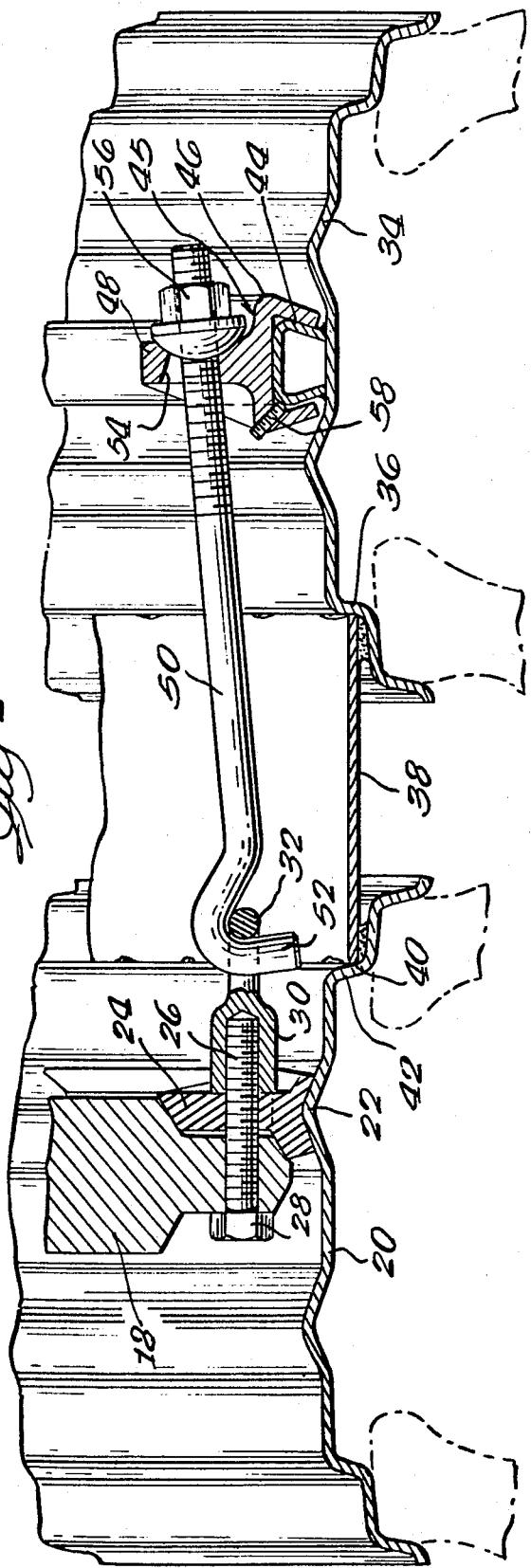

WHEEL CONSTRUCTION

This is a division of application Ser. No. 855,494 filed Sept. 5, 1969, and now abandoned.

BACKGROUND AND SUMMARY OF THE INVENTION

This invention relates to a new and improved dual wheel construction for vehicles.

The invention further relates to means for attaching a second or auxiliary wheel to the existing wheel of a vehicle such as a tractor. It has long been recognized that a vehicle will have increased floatation and traction with greater ground-engaging surfaces of its wheels. This is especially true of rubber tired wheels and is accomplished either by enlarging the rubber tires used or adding wheels with additional tires. It has been found that most tractors can have auxiliary wheels attached to the outside of its regular wheels without interfering with the existing physical limitations of the tractor and yet provide additional floatation and traction for the tractor. Since manufacturers of tractors and other vehicles do not follow rigid standards in the design of their wheels it is a problem to make an auxiliary wheel which will be readily adaptable to all makes of tractors. To overcome this problem, attempts have been made to provide an auxiliary wheel construction that is readily adaptable for adjustment to any make of tractor or vehicle wheel. In some instances, adjustable brackets have been provided for angular positioning about the auxiliary tire rim in alignment with lugs on the regular tire rim. However, with the presently available structures, when the auxiliary tire is removed from the regular tire, the adjustable brackets either become totally separated from the auxiliary tire structure or they are so loosely mounted thereon that they lose their angular positional relationship on the auxiliary tire rim and therefore must be readjusted when the auxiliary tire is reattached to the regular tire. This invention is directed to solving such problems.

An important object of this invention, therefore, is to provide an auxiliary wheel structure for vehicles, the wheel being readily adaptable for attachment to an existing vehicle wheel by employing adjustable mounting brackets, and means are provided to prevent removal of the brackets from the auxiliary tire rim while permitting adjustment and means are provided to selectively lock the brackets to the auxiliary tire rim when disconnected from the regular tire.

Another object of the invention is to provide an auxiliary wheel structure of the character described for attachment to and rotation with the regular wheel of a vehicle in which the regular wheel has a wheel spider, a wheel rim, and arcuately spaced apart wheel lugs joining the wheel spider to the wheel rim. The auxiliary wheel structure comprises a wheel rim, arcuate track means fixedly attached to the auxiliary wheel rim, attaching brackets mounted on the arcuate track means for adjustment therealong to positions in alignment with the lugs on the regular wheel when the wheel rims are in side-by-side relationship, and means connecting the brackets to the regular wheel lugs to mount the auxiliary wheel structure to the regular wheels. The attaching brackets have means mounting them on the arcuate means to permit sliding adjustment thereabout but preventing removal of the brackets from the track. In one embodiment of the invention, the arcuate track means comprises a rolled member affixed to the auxiliary tire rim and having a dovetail configuration in cross section, with a complementary dovetail portion of the attaching brackets embracing the track means. In another form of the invention, an annular band is affixed to the auxiliary tire rim and the brackets each have a body portion overlying the band and a flange portion extending over each end of the band and extending beneath the band to permit sliding movement of the brackets along the band but preventing removal of the brackets therefrom.

A further object of the invention is to provide an auxiliary wheel structure of the character described including means to lock the adjustable attaching brackets to the track means in any of their positions of adjustment. In the form of the invention shown herein, set screw means are provided on the brackets for threading into locking frictional engagement with the track means. In a third form of the invention set forth in the preceding paragraph, the set screw means extends beneath the annular band at one edge thereof as a substitute structure for one of the flange portions to permit selective removal of the brackets from the annular band.

An additional feature of the invention is to provide an auxiliary wheel structure of the character described wherein each attaching bracket includes a base portion embracing the track means and an upstanding body portion extending radially inwardly from the base portion for receiving connecting means therebetween and the regular tire rim, and including supporting brace members angularly disposed about and affixed to the body portion of the attaching brackets and extending toward the regular wheel and into abutment with a portion of the rim of the auxiliary wheel.

Other objects, features and advantages of the invention will become apparent from the following detailed description taken in connection with the accompanying drawings.

DESCRIPTION OF THE DRAWINGS

FIG. 1 is a front elevation view of an agricultural type tractor embodying a dual wheel structure;

FIG. 2 is a partial section through both the regular and auxiliary tire rims and embodying one form of the attaching means of the present invention;

FIG. 3 is a section similar to that of FIG. 2, embodying a second form of the present invention;

FIG. 4 is a section similar to that of FIG. 2, embodying a third form of the present invention.

DETAILED DESCRIPTION OF THE DRAWINGS

Figure 5:
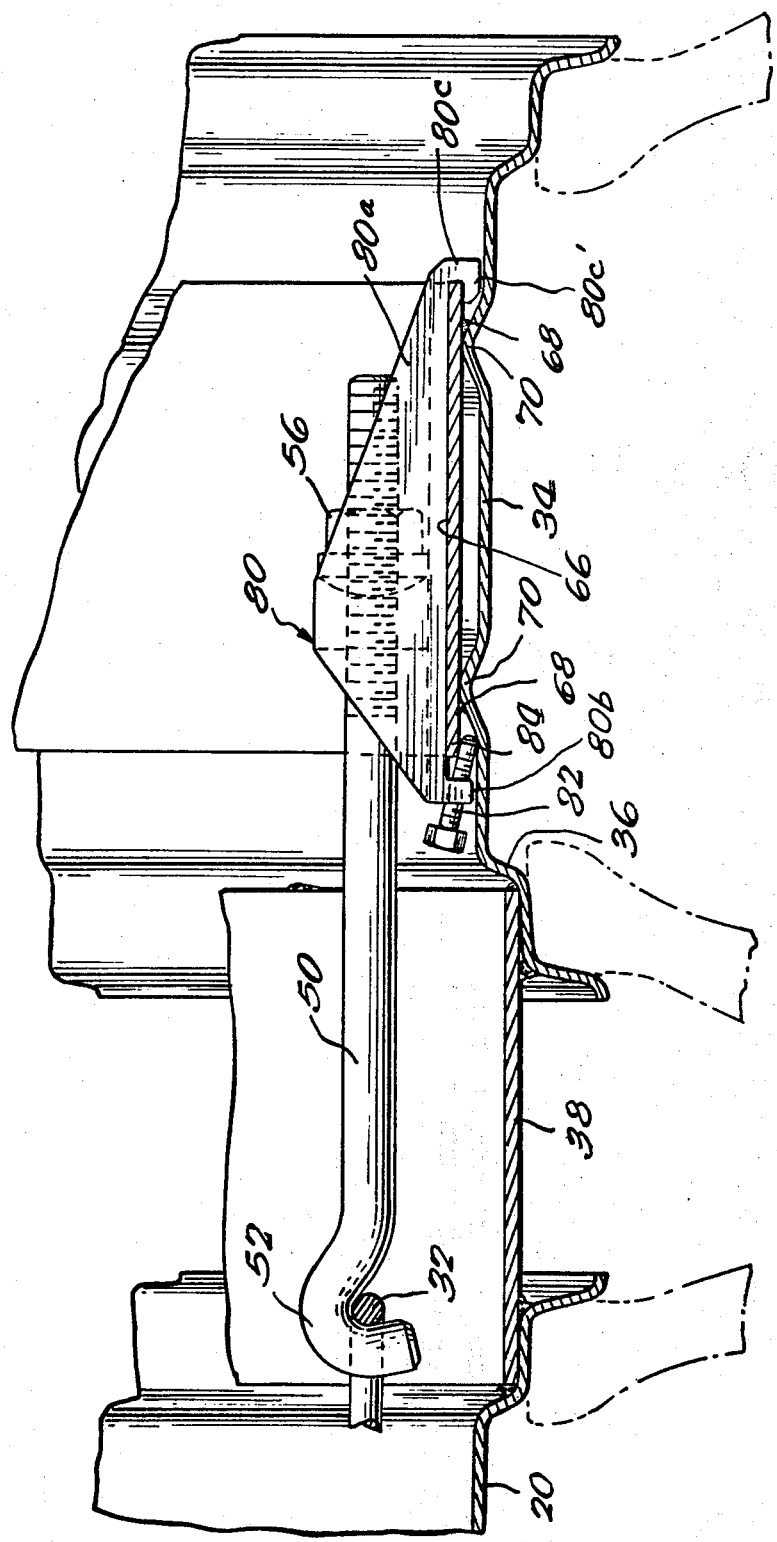
FIG. 5 is a section through the auxiliary tire rim and including support means for the attaching brackets shown in FIG. 2.

Referring to FIG. 1, the reference numeral 10 indicates generally an agricultural-type tricycle tractor. This type of tractor has been used merely as being illustrative of the type of vehicles on which the auxiliary wheels of this invention may be used to greatly multiply the available floatation and traction. Obviously, any type or style of tractor having ground-engaging traction wheels could have the dual wheel construction of this invention mounted thereon. The invention disclosed herein is concerned with means for attaching auxiliary wheels, generally designated 12, to the regular wheels, generally designated 14, of a tractor or other vehicle.

The regular tractor wheels 14 are mounted on an axle 16 supported in an appropriate axle housing.

As best shown in FIGS. 2 and 3, the regular tractor wheel 14 is provided with a cetnter support or spider 18 which carries at its outer periphery a rim 20. The rim 20 is provided with at least one radially inwardly projecting annular bead 22 which is used as the basis for holding and centering the rim 20 on the wheel spider or support 18. The inerlocking means between the spider and rim is a Y-shaped bracket 24. The diverging arms of the Y straddle the radially inwardly projecting bead 22 of the rim 20 while the center leg of the Y snuggly abuts an outer annular portion of the wheel spider 18. Bolts 26 pass through aligned apertures in the spider 18 and the bracket 24 to enable the wheel spider and the bracket to be held rigidly together. Concurrently, of course, the rim 20 is held in fixed position relative to the spider by means of the arrangement of the rim and the bracket 24. Suitable nuts 28 are employed to cooperate with the bolts 26 to form the unitary assembly as shown in the drawings and just described. The number of rim holding lugs is variable with different tractor and vehicle manufacturers depending primarily upon the loads the vehicles are intended to carry. The auxiliary wheel structures of the present invention are readily adaptable for attachment to all wheels of the same diameter regardless of the number of lugs employed or the arcuate spacings of such lugs. In the device illustrated in FIGS. 2 and 3, special cooperative nuts 30 are shown in engagement with the lug bolts 26. In this form of the invention it is to these cooperative nuts that the auxiliary wheels 12 are attached and gain their support on the regular wheels 14. The cooperative nuts 30 have integrally formed eyelets 32 projecting axially from the outer end thereof. The eyelets 32 are utilized to hold the auxiliary wheels to the regular wheels.

The auxiliary wheels 12 each are provided with a rim 34 substantially the same in cross sectional configuration as the rim 20 of the regular wheel 14. The rim 34 is provided with an annular shoulder 36 which carries on its inner annular surface spacer means 38 which is shown herein as an annular band weldably attached at its axially outer edge to the rim 34 at the position of the annular shoulder 36. The annular spacer band 38 has an axially inner free edge 40 which is adapted to rest in a comparable annular shoulder 42 of the regular rim 20. Thus when the auxiliary rim is drawn up tightly to the regular wheel the spacer band 38 provides the means for maintaining uniform spacing between the regular and auxiliary wheels. The spacer means need not be welded or otherwise attached to either of the auxiliary or regular wheels but may be nested between the rims in the offset shoulders.

In the form of the invention shown in FIG. 2, an arcuate track means 44 having a dovetail configuration is welded on a flat center portion of the auxiliary wheel rim 34. The track means 44 is a rolled member and extends radially inwardly from the rim 34 and constitutes a track on which bracket means may be adjustably positioned for accommodating any number of spacings of wheel attaching means. Slidable brackets, generally designated 45, are provided having a dovetail type connection with the track means 44. The bracket shown in FIG. 2 includes a base portion 46 mating with and embracing the dovetail track means 44, and an upstanding attaching or body portion 48 extending radially inwardly from the base portion 46 for receiving a means for interconnecting the eyelets 32 of the nut members 26 or other attaching means on the regular wheel and the adjustable brackets 45 on the auxiliary wheel. In the preferred embodiment, this interconnecting means comprises a J-bolt 50 which is provided at its inner end with a hook 52 which is used to engage the eyelets 32. The opposite end of the J-bolt extends through a hole 54 in the body portion 48 of the bracket 45 and a nut 56 is threaded on that end on the outer side of the bracket to draw the rims tightly together with the wheels in a side-by-side relationship as shown in FIG. 1.

A lock means in the form of a set screw 58 is provided on each of the brackets 45 to lock the brackets in their positions of adjustment in alignment with the lugs on the regular wheel, or in alignment with the eyelets 32 secured to the ends of lug bolts 26. The set screws 58 are threadable into locking fricitonal engagement with the track means 44.

With the construction of the track means 44 and the brackets 45 as set forth in the preceding paragraph, two advantages are readily apparent. First, the brackets are slidably adjustable around the track means 44 and the complementary dovetail connection between the brackets and track means prevents the brackets from becoming disengaged from the track means. This is particularly important in mounting the auxiliary wheels 12 onto the regular wheels 14 because no manual manipulation is necessary to assure that the brackets stay on the track means as they are slidably adjusted therealong. Secondly, the locking means 58 permit the brackets 45 to be locked in their positions of adjustment for any particular angular spacing of the lugs on the regular tire and the brackets will be maintained in such position when the auxiliary tires are removed and stored. No adjustments therefore are necessary when the auxiliary tires are reattached to the tractor.

Turning to FIG. 4, to add rigidity to the structure shown in FIG. 2, a supporting brace member 60 may be affixed to the body portion 48 of each bracket 45 so as to extend axially inwardly toward the regular wheel 14 and into abutment with a flat portion of the auxiliary rim 34, as at 62 in FIG. 4. For yet further support, the brace member 60 may be formed (as in phantom in FIG. 4) so as to extend all the way into abutment with the spacer band 38, as at 64.

A second form of the invention is shown in FIG. 3 wherein the track means is shown as an annular band 66 welded at 68 to the auxiliary wheel rim 34. The annular band 66 projects axially outwardly and inwardly from a pair of spaced beads 70 of the wheel rim 34. The annular band 66 constitutes a track on which a plurality of brackets, generally designated 72, are adjustably positioned similar to the embodiment shown in FIG. 2. As with the dovetail track means 44, the annular band 66 provides for an infinite number of adjustable positions for the brackets.

The brackets 72 each have an upstanding or radially inwardly projecting body portion 72a and a pair of flange portions 72b extending over each edge of the annular band 66 and extending beneath the band as at 72c. In this fashion, the brackets 72 embrace the band and permit sliding adjustment therealong but prevent removal of the brackets from the band for purposes set forth above. A set screw member 74 is threaded into a boss portion 76 of the bracket 72 for movement into locking frictional engagement with the axially inner edge of the band 66. The axially outer end of the J-bolt 50 is received in the body portion 72a of the bracket 72 similar to the embodiment shown in FIG. 2.

A third form of the invention is shown in FIG. 5 wherein the track means is identical to that shown in FIG. 3 and comprises the annular band 66 welded at 68 to the auxiliary wheel rim 34. As with the form of the invention shown in FIG. 3, the annular band 66 projects axially outwardly and inwardly from a pair of spaced beads 70 of the wheel rim 34 and constitutes a track on which a plurality of brackets, generally designated 80, are adjustably positioned similar to the embodiment shown in FIGS. 2 and 3, with the band providing for an infinite number of adjustable positions for the brackets.

The brackets 80 each have an upstanding or radially inwardly projecting body portion 80a, similar to the brackets shown in FIG. 3, and a pair of flange portions 80b and 80c extending over each edge of the annular band 66. However only the flange portion 80c extends beneath the band, as at 80c'. A set screw member 82 is threaded through the flange portion 80b for movement into locking engagement with the wheel rim 34, on one side of one of the beads 70. As the set screw member 82 is threaded toward the rim 34 it will move under the edge 84 of the band 66. In this form of the invention, the set screw member performs three functions. First, as with the other forms of the invention, it locks the brackets in place on the track means, but in this form it frictionally locks with the wheel rim. Second, it prevents removal of the bracket from the track or band 66 (when the screw is threaded away from the rim, but not past the band edge 84) while permitting sliding movement of the bracket about the band. Third, it permits selective removal of the bracket from the band by threadingly moving the screw outwardly beyond the band edge 84.

The axially outer end of the J-bolt 50 is received in the body portion 80a of the bracket 80 similar to the forms of the invention shown in FIGS. 2 and 3.

It should be pointed out that two or more auxiliary wheels may be attached by using any of the bracket structures shown herein. To attach additional wheels, a second set of brackets is placed on the first auxiliary wheel facing opposite to those brackets shown in the drawings, and a set of brackets are placed on the second auxiliary wheel, and so on. Between those added sets of brackets, draw bolts may be used rather than the eye 32 and J-bolt 50.

The foregoing detailed description has been given for clearness of understanding only and no unnecessary limitations should be understood therefrom as some modifications will be obvious to those skilled in the art.

I claim:

1. An auxiliary wheel structure for attachment to and rotation with the regular wheel of a vehicle in which the regular wheel has a wheel spider, a wheel rim, and arcuately spaced apart wheel lugs joining the wheel spider to the wheel rim, said auxiliary wheel structure comprising a wheel rim, arcuate track means dovetail in cross section fixedly attached to said auxiliary wheel rim, attaching brackets slidably mounted on said arcuate track means for adjustment therealong to positions in alignment with said lugs on the regular wheel when the wheel rims are placed in side-by-side relationship, said attaching brackets having means mounting them on said track means to permit said sliding adjustment but preventing removal of the brackets from the track means, and means connecting said brackets to said wheel lugs to mount the auxiliary wheel structure to the regular wheel in side-by-side relationship.

2. The auxiliary wheel structure of claim 1 including locking means to lock said attaching brackets against movement relative to said track means in any of said positions of adjustment.

3. The auxiliary wheel structure of claim 2 wherein said locking means locks said attaching brackets and said track means together.

4. The auxiliary wheel structure of claim 1 wherein said brackets and said track means have portions comprising a dovetail type connection therebetween permitting said sliding adjustment while preventing removal of the brackets from the track means.

5. The auxiliary wheel structure of claim 1 wherein said arcuate track means comprises a rolled member affixed to said rim and having a dovetail configuration in cross section, with a complementary portion of said brackets embracing the track means.

6. The auxiliary wheel structure of claim 5 wherein said brackets each include a base portion embracing the track means and an attaching portion extending radially inwardly from said base portion for receiving said connecting means.

7. The auxiliary wheel structure of claim 1 wherein said attaching brackets each includes a base portion embracing said track means and an upstanding body portion extending radially inwardly from the base portion for receiving said connecting means, and including supporting brace means supporting at least some of said brackets against rotation about said track means.

8. The auxiliary wheel structure of claim 7 wherein said supporting brace means is affixed to said body portion and extends toward said regular wheel.

9. The auxiliary wheel structure of claim 8 wherein said supporting brace means abuts the rim of said auxiliary wheel.

10. The auxiliary wheel structure of claim 8 including spacer means between the rims of said regular and auxiliary wheels, and said supporting means abuts said spacer means.

11. An auxiliary wheel structure for attachment to and rotation with the regular wheel of a vehicle in which the regular wheel has a wheel spider, a wheel rim, and arcuately spaced apart wheel lugs joining the wheel spider to the wheel rim, said auxiliary wheel structure comprising a wheel rim, arcuate track means fixedly attached to said auxiliary wheel rim, attaching brackets slidably mounted on said arcuate track means for adjustment therealong to positions in alignment with said lugs on the regular wheel when the wheel rims are placed in side-by-side relationship, said attaching brackets having means mounting them on said track means to permit said sliding adjustment but preventing removal of the brackets from the track means, and means connecting said brackets to said wheel lugs to mount the auxiliary wheel structure to the regular wheel in side-by-side relationship, said attaching brackets each including a base portion embracing said track means and an upstanding body portion extending radially inwardly from the base portion for receiving said connecting means, and including supporting brace means affixed to said body portion and extending toward said regular wheel and into abutment with a portion of the rim of said auxiliary wheel.

12. In a dual wheel mounting assembly for mounting an auxiliary wheel having a rim to a vehicle mounted wheel having a rim and having stationary mounting means fixed stationarily on the inner surface of the rim of the auxiliary wheel and extending radially inward from said rim surface, and attachimg means including attaching bracket means and elongated connecting means attached to the bracket means for mounting the auxiliary wheel to the vehicle mounted wheel, said bracket means being removably mounted to said stationary mounting means at a location spaced from the inner surface of the rim of the auxiliary wheel, wherein the improvement in said assembly comprises in combination:

supporting means separate from said stationary mounting means coacting between said bracket means and adapted to contact the rim of at least one of said wheels at a location spaced from said stationary mounting means to support said bracket means against rotation about the stationary mounting means.

13. In the mounting assembly of claim 12 wherein said supporting means includes rigid means formed integrally with the bracket means, one end of said rigid means bearing against the inner surface of the rim of the auxiliary wheel when the elongated connecting means is tensioned.

14. In the mounting assembly of claim 12, wherein said stationary mounting means comprises arcuate track means extending radially inward from the inner surface of the auxiliary wheel rim and having a portion thereof extending in at least one direction substantially parallel to the inner surface of the rim and spaced from said inner surface wherein said bracket means includes flange means for engaging said portion, and said supporting means comprises rigid means extending from said bracket means to said inner surface of the rim and toward said vehicle mounted wheel.

15. In the mounting assembly of claim 12, wherein said supporting means includes rigid means comprising an elongated brace member, one end of said elongated brace member being formed integrally with said bracket means, the length of said brace member being such that the other end of said brace member bears against the inner circumference of the rim of the auxiliary wheel when the elongated connecting means is tensioned.

16. In a dual wheel mounting assembly for mounting an auxiliary wheel having a rim to a vehicle mounted wheel having a rim and having stationary mounting means fixed stationarily on the inner surface of the rim of the auxiliary wheel and extending radially inward from said rim surface, attaching means including attaching bracket means and elongated connecting means attached to the bracket means for mounting the auxiliary wheel to the vehicle mounted wheel, said bracket means being removably mounted to said stationary mounting means at a location spaced from the inner surface of the rim of the auxiliary wheel, and spacer means between the rims of said vehicle mounted and auxiliary wheels, wherein the improvement in said assembly comprises in combination:

supporting means including rigid means comprising an elongated brace member, one end of said elongated brace member being formed integrally with said bracket means, the length of said brace member being such that the other end of said brace member bears against said spacer means when the elongated connecting means is tensioned to support said bracket means against rotation about the stationary mounting means.

* * * * *